(12) United States Patent
Tuyls et al.

(10) Patent No.: US 6,260,477 B1
(45) Date of Patent: Jul. 17, 2001

(54) AUTOFILL SYSTEM WITH IMPROVED AUTOMIXING

(75) Inventors: James M. Tuyls; Richard A. Martindale, both of Vacaville; Charles E. Bennett, Sacramento; Antonio J. Jepson, Dixon, all of CA (US)

(73) Assignee: Automatic Bar Controls, Inc., Vacaville, CA (US)

( * ) Notice: Subject to any disclaimer, the term of this patent is extended or adjusted under 35 U.S.C. 154(b) by 0 days.

(21) Appl. No.: 09/426,406

(22) Filed: Oct. 25, 1999

(51) Int. Cl.[7] .................................. A23F 3/00; B01F 3/04
(52) U.S. Cl. ..................... 99/323.2; 99/275; 261/DIG. 7; 366/153.1; 139/101.19; 139/101.21
(58) Field of Search ................................ 99/323.2, 323.1, 99/275; 366/153.1; 137/101.19, 101.27; 261/DIG. 7

(56) References Cited

U.S. PATENT DOCUMENTS

| | | | |
|---|---|---|---|
| 4,416,194 | * | 11/1983 | Kemp ................................ 99/323.2 X |
| 4,955,723 | * | 9/1990 | Schneider ........................ 366/153.1 X |
| 5,511,876 | * | 4/1996 | Plessers et al. .................... 366/153.1 |
| 5,537,914 | * | 7/1996 | Gibney et al. ........................ 99/323.2 |
| 5,706,661 | * | 1/1998 | Frank ................................ 99/323.2 X |
| 5,951,161 | * | 9/1999 | Blagg ................................. 366/153.1 |

* cited by examiner

Primary Examiner—Reginald L. Alexander

(74) Attorney, Agent, or Firm—Townsend and Townsend and Crew LLP

(57) ABSTRACT

This invention provides a system and a method of mixing and dispensing a beverage from a beverage concentrate. A mixing device receives a beverage concentrate and water, and employs a static mixing device to mix the concentrate and water to produce a beverage in a closed system. Flow regulators precisely control the flows of the beverage concentrate and water to achieve the desired mixing ratio. The carbonation system may include a pump for pumping the beverage from the mixing device to a carbonator, a refrigeration unit, a beverage dispenser, or other. A transformer is coupled with the pump and one or more solenoid valves in the mixing device. The transformer receives power from the pump motor to activate the solenoid valves to allow flow of the beverage out of the mixing device only when the pump is powered. When the pump is shut off, the power to the transformer is terminated and the solenoid valves are switched off to stop the flow of the beverage out of the mixing device. Alternatively, a level sensor is used to sense the liquid level in the carbonator tank. A liquid level control is coupled with the level sensor and with the transformer, and sends a signal to the transformer to activate the solenoid valves to flow beverage into the tank when the level sensor senses a liquid level below a preset minimum level. After the liquid level in the tank reaches a sufficient level, the liquid level control shuts off the transformer to stop the flow of beverage out of the mixing device. A sampling port is provided in a bypass line coupled to the beverage conduit in the mixing device to provide real time monitoring of the beverage for consistency and mixing ratio. The flow regulators can be adjusted in real time to achieve and maintain the desired mixing.

26 Claims, 2 Drawing Sheets

AUTOFILL SYSTEM WITH IMPROVED AUTOMIXING

BACKGROUND OF THE INVENTION

This invention relates generally to high volume mixing and dispensing beverages and, more particularly, to a system and a method for improved control of the flow and mixing of a beverage.

Conventional beverage mixing and dispensing systems employ an open intermediary mixing tank for receiving and mixing a beverage concentrate and water to produce a beverage which is drawn from the intermediary tank to a carbonator or dispenser for dispensing. When the amount of the beverage drops in the open tank below a preset level, additional beverage concentrate and water are flowed into the intermediary tank to refill the tank. The intermediary tank is typically large to avoid the need for frequent refilling which interrupts the dispensing operation. The tank must be vented or open to the atmosphere to prevent vacuum. Such an open system is very susceptible to contamination. Moreover, large quantities of the beverage may need to be discarded if the mixing ratio does not meet the requirement. Open systems require frequent, often weekly, sanitization with significant product waste resulting.

When it is desired to provide a carbonated beverage, the carbonator pump of a carbonator pumps the beverage to a carbonator tank, and carbon dioxide is injected into the carbonator tank. The relative proportions of the beverage and the carbon dioxide are maintained within a range to produce a properly carbonated beverage. Typically the carbon dioxide has a pressure that is higher than the pressure of the beverage inside the carbonator tank. The carbonator pump is a flow-through pump that is powered only when necessary to refill the carbonator tank and ensures that the carbon dioxide does not drive the beverage out of the tank due to the pressure differential. In situations where the beverage pressure inside the carbonator tank is approximately equal to or higher than the pressure of the carbon dioxide, however, the flow of the beverage into the carbonator tank using conventional mechanisms will tend to drive out the carbon dioxide so that the proportion of the beverage in the tank will be unacceptably high, and the resulting beverage is either not carbonated or inadequately carbonated.

SUMMARY OF THE INVENTION

The present invention relates to an autofill system for mixing and dispensing beverage with improved control of the mixing and flow of the beverage. The invention provides a closed system for mixing and dispensing the beverage. Real time monitoring of the beverage for consistency and mixing ratio is provided at or near the point of mixing so that real time adjustments can be made when necessary to correct the flow rates of the beverage concentrate and water to achieve the desired mixing. The flow of the beverage out of the mixing device is controlled by a switch such as a solenoid valve. The switch is turned on to allow flow of the beverage out of the mixing device only when the carbonator pump is powered. In a specific embodiment, the solenoid valve is electrically coupled to a transformer which receives power to activate the solenoid valve only when the carbonator pump is turned on. When the carbonator pump is shut down, the power to the transformer is terminated and the solenoid is turned off to stop the flow of the beverage out of the mixing device. The flow control of the beverage out of the mixing device prevents undesirable flow of the beverage and avoids problems such as excess accumulation of beverage in a carbonator tank which fails to meet the required proportions of beverage and carbon dioxide.

In accordance with an aspect of the present invention, a system for preparing a beverage from a beverage concentrate comprises a mixing device having a beverage concentrate inlet for receiving a beverage concentrate, a water inlet for receiving water, and an outlet. The mixing device mixes the beverage concentrate and the water to produce a beverage for dispensing through the outlet. A carbonator has a carbonator inlet coupled with the outlet of the mixing device, and includes a carbonator control. A control unit is coupled with the carbonator control and the mixing device for controlling flow of the beverage from the mixing device to the carbonator in response to the carbonator control.

In one embodiment, the carbonator control comprises a pump for pumping the beverage from the outlet of the mixing device to the carbonator. The control unit allows flow of the beverage from the mixing device to the carbonator when the pump is powered, and stops flow of the beverage from the mixing device to the carbonator when the pump is not powered.

In another embodiment, the carbonator comprises a carbonator tank having a beverage inlet for receiving beverage from the mixing device. The carbonator control comprises a level sensor for measuring liquid level in the carbonator tank. The control unit allows flow of the beverage from the mixing device to the carbonator when the level sensor senses a liquid level below a preset minimum level, and stops flow of the beverage from the mixing device to the carbonator when the level sensor senses a liquid level at or above a preset maximum level.

The mixing device may include a switch which is controllable by the control unit between an ON position to allow flow of the beverage through the outlet and an OFF position to stop flow of the beverage through the outlet. In a specific embodiment, the switch comprises at least one solenoid valve, the control unit comprises a transformer, and the carbonator pump comprises a carbonator pump motor electrically coupled with the transformer. The carbonator pump motor supplies power to the transform to activate the solenoid valve to allow flow of the beverage through the outlet of the mixing device only when the carbonator pump motor is powered. The mixing device includes a static mixing tube. A sampling port for sampling the beverage is provided in a bypass line coupled to a main beverage line between the static mixing tube and the outlet of the mixing device.

In accordance with another aspect of the invention, an apparatus for preparing a beverage from a beverage concentrate comprises a mixing device having a beverage concentrate inlet for receiving a beverage concentrate, a diluter inlet for receiving a diluter, and an outlet. The mixing device mixes the beverage concentrate and the diluter to produce a mixed beverage for dispensing through the outlet. A beverage flow line is disposed downstream of and coupled with the outlet of the mixing device. A pump is coupled with the beverage flow line downstream of the outlet of the mixing device for pumping the beverage from the outlet. A control line is coupled between the mixing device and the pump. A control unit is coupled with the control line. The control unit allows flow of the beverage from the outlet of the mixing device to the pump when the pump is powered and stops flow of the beverage from the outlet of the mixing device to the pump when the pump is not powered. The apparatus desirably includes a sampling port coupled to the mixing device for sampling the mixed beverage and means for adjusting flow rates of the beverage concentrate and diluter into the mixing device to achieve a desired mixing ratio.

In accordance with another aspect of the invention, an apparatus for preparing a beverage from a beverage concentrate comprises a mixing device having a beverage concentrate inlet for receiving a beverage concentrate, a diluter inlet for receiving a diluter, and an outlet. The mixing device mixes the beverage concentrate and the diluter to produce a mixed beverage for dispensing through the outlet. A beverage flow line is disposed downstream of and coupled with the outlet of the mixing device. A carbonator includes a carbonator tank having a beverage inlet coupled with the beverage flow line and a carbonation inlet coupled to a source of carbon dioxide. The carbonator includes a level sensor for measuring liquid level in the carbonator tank. A control line is coupled between the mixing device and the level sensor. A control unit is coupled with the control line. The control unit allows flow of the beverage from the outlet of the mixing device to the carbonator when the level sensor senses a liquid level below a preset minimum level, and stops flow of the beverage from the mixing device to the carbonator when the level sensor senses a liquid level at or above a preset maximum level.

Another aspect of the present invention is directed to a method of preparing a beverage from a beverage concentrate. A mixing device is provided for mixing a beverage concentrate and a diluter to produce a mixed beverage. A pump is provided for pumping the mixed beverage out of the mixing device. A control unit is coupled with the mixing device and the pump to allow flow of the mixed beverage out of the mixing device only when the pump is powered.

BRIEF DESCRIPTION OF THE DRAWINGS

The specific embodiments of this invention, illustrating all their features, will now be discussed in detail. These embodiments depict the novel and nonobvious beverage mixing system and method of this invention shown in the accompanying drawings, which are included for illustrative purposes only. These drawings include the following figures, with like numerals indicating like parts.

DESCRIPTION OF THE SPECIFIC EMBODIMENTS

Figure 1:
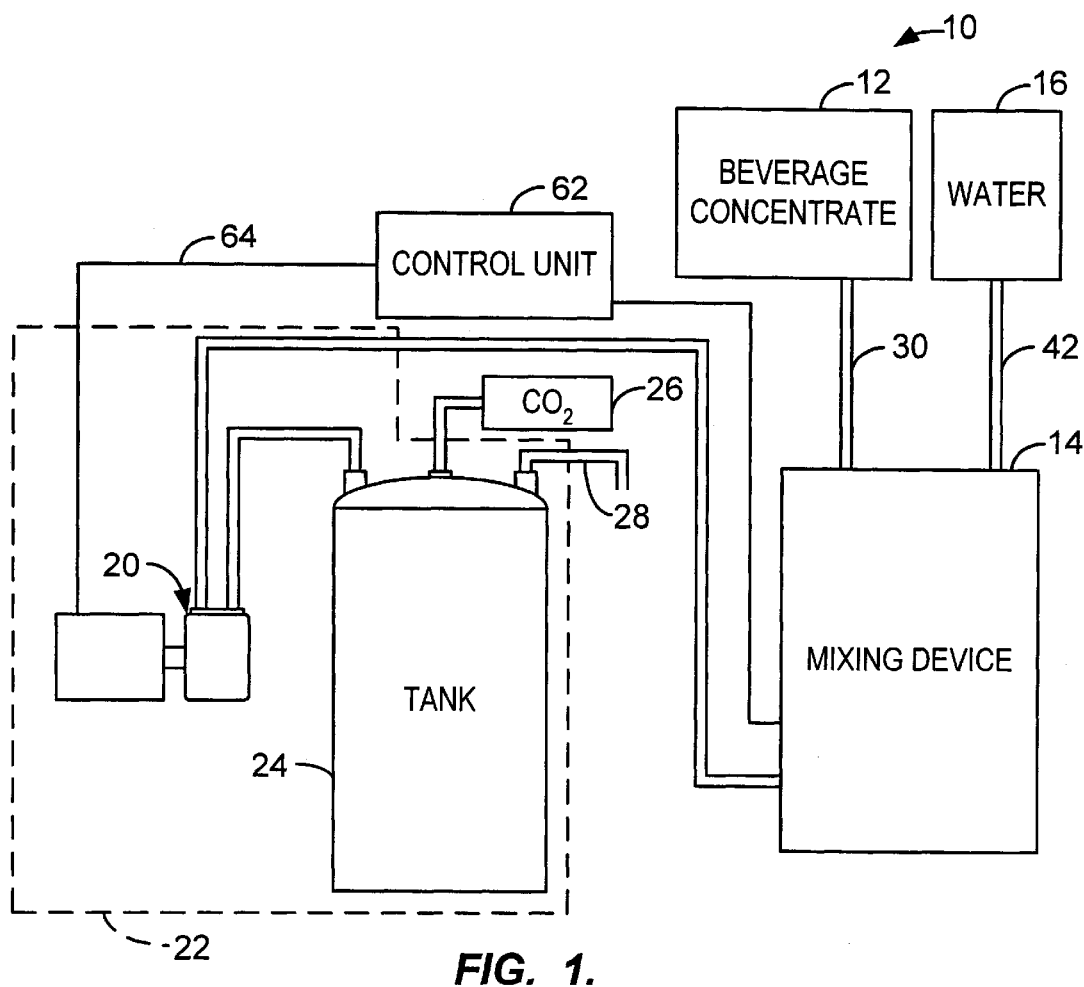
FIG. 1 is a block diagram schematically illustrating an autofill system in accordance with an embodiment of the present invention.

FIG. 1 schematically illustrates a system 10 for mixing a beverage from a beverage concentrate provided by a beverage concentrate source 12. The source 12 typically includes a beverage concentrate bag. The beverage concentrate source 12 is coupled to an inlet of a mixing device 14. A beverage pump (not shown) may be provided to pump the beverage concentrate from the source 12 to the mixing device 14. The mixing device 14 receives water from a water source 16 for mixing with the beverage concentrate from the beverage concentrate source 12 to dilute the concentrate and produce a mixed beverage. A different diluter may be used instead of water. The mixed beverage flows through an outlet of the mixing device 14 to a beverage line 18 which is coupled to a pump 20. In this embodiment, the pump 20 is a carbonator pump of a carbonator 22 used to produce carbonated beverage from the mixed beverage from the mixing device 14. The carbonator pump 20 is typically a flow-through pump. An example of a carbonator 22 is a commercially available Multiplex pump. The carbonator pump 20 pumps the beverage to a carbonator tank 24. The carbonator tank 24 receives carbon dioxide from a source 26. Carbonated beverage is dispensed from the carbonator tank 24 to a dispensing line 28. The carbonator 22 may include a refrigeration unit for cooling the beverage.

Figure 2:
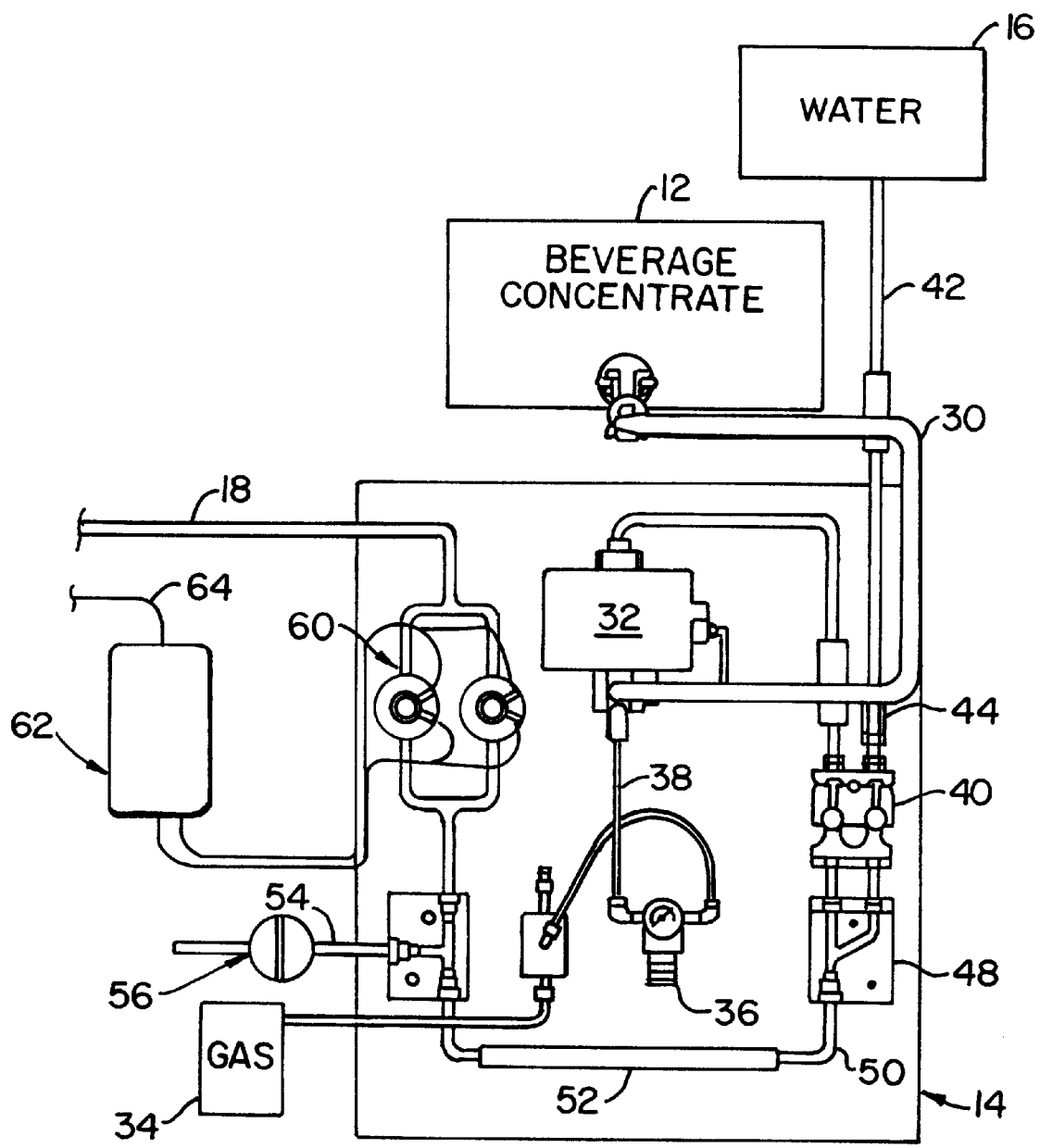
FIG. 2 is a schematic view illustrating the mixing device of the autofill system of FIG. 1.

An embodiment of the mixing device 14 is shown in FIG. 2. The beverage concentrate flows from the beverage concentrate source 12 to the mixing device 14 through a beverage concentrate conduit 30. A beverage concentrate pump 32 is provided for pumping the beverage concentrate from the source 12. In this embodiment, the pump 32 is driven by gas such as carbon dioxide or air from a gas source 34. A gas pressure regulator 36 is typically used to control the pressure of the gas in the gas conduit 38 coupled between the gas source 34 and the pump 32.

The mixing device 14 includes a brix manifold 40 for receiving the beverage concentrate from the beverage concentrate conduit 30 and water from the water conduit 42 which is coupled to the water source 16. A check valve 44 is typically provided in the water conduit 42 just upstream of the inlet to the brix manifold 40. The brix manifold 40 advantageously includes flow regulators for regulating the flow rates of the beverage concentrate and the water therethrough to obtain a consistent and accurate mixing ratio which is not affected by any pressure fluctuations in the beverage concentrate conduit 30 and the water conduit 42. The brix manifold 40 is preferably adjustable for varying the flow rates of the beverage concentrate and the water to achieve the desired mixing ratio. The beverage concentrate and water flow from the brix manifold 40 to a brix manifold block 48 which merges the beverage concentrate and water into a mixed beverage conduit 50. In the embodiment shown, a Y-connector is employed in the brix manifold block 48. The mixed beverage then flows from the conduit 50 out of the mixing device 14 to the beverage line 18 for carbonation, refrigeration, and/or dispensing.

A mixing mechanism 52 is preferably provided to mix the beverage concentrate and water more thoroughly prior to flowing out to the beverage line 18. The embodiment shown in FIG. 2 employs an in-line static mixing tube 52 which includes a static spiral member disposed inside a tube. A static mixing tube of this type is available from Koflo Corporation.

The autofill system 10 desirably includes a bypass line 54 and a sampling port 56 coupled to the mixed beverage conduit 50 for sampling the mixed beverage for consistency and mixing ratio. The sampling port 56 has a shut-off valve which can be opened for flowing a small amount of mixed beverage from the conduit 50 through the bypass line 54 for sampling the beverage mixture. When sampling is completed, the shutoff off valve in the sampling port 56 is closed. In this embodiment, the bypass line 54 is coupled downstream of the static mixing tube 52.

As shown in FIGS. 1 and 2, the autofill system 10 includes a switch 60 which is controllable by a control unit 62 between an ON position to allow flow of the beverage from the mixing device 14 to the beverage line 18 and an OFF position to stop flow of the beverage to the beverage line 18. This embodiment employs one or more solenoid valves in the mixed beverage conduit 50 as the switch 60. The control unit is a transformer 62 which is electrically coupled between the solenoid valves 60 and the motor of the carbonator pump 20 via a control line 64. When the carbonator pump 20 is powered, the carbonator pump motor supplies power to the transformer 62 to activate the solenoid valves 60 to allow flow of the beverage therethrough to the beverage line 18. When the carbonator pump 20 is shut down, the power to the transformer 62 is terminated and solenoid valves 60 are deactivated, thereby stopping the flow of the beverage to the beverage line 18.

The use of the switch 60 and control unit 62 ensures that the beverage flows to the carbonator 22 only when the carbonator pump 20 is powered. This feature is particularly advantageous in situations where the flow of the beverage needs to be controlled for proper operation of the system 10. For example, the relative proportions of the beverage and the carbon dioxide in the carbonator tank 24 of the carbonator 22 in the embodiment shown in FIG. 1 need to be maintained within a specific range. The pressure of the beverage and the pressure of the carbon dioxide inside the carbonator tank 24 may be different. If the flows of the beverage and carbon dioxide into the tank 24 are not controlled, the one at the higher pressure will tend to push the other out and occupy an increasing proportion of the volume of the tank 24, resulting in an improperly carbonated beverage with too much or too little carbonation. Controlling the beverage flow and carbon dioxide flow into the tank 24 helps maintain the desired proportions of the beverage and carbon dioxide in the tank 24.

In a specific example, the pressure of the beverage is approximately equal to or higher than the pressure of the carbon dioxide inside the tank 24. For instance, the carbon dioxide pressure is about 35–40 psi, while the pressure of the beverage is approximately equal to or higher than 40 psi. The level of the beverage inside the tank 24 is monitored by, for example, a level sensor. Typically the beverage occupies about 80% of the volume of the tank 24 and the carbon dioxide occupies the remaining 20%. When the beverage level falls below a minimum, the carbonator pump 20 is powered to open the flow of the beverage by supplying power to the transformer 62 to activate the solenoid valves 60, and to pump the beverage from the mixing device 14 to the carbonator tank 24. For instance, the level sensor can send a signal to a power source for activating the power source to turn on the carbonator pump 20. After the beverage rises to the desired level in the tank 24, the level sensor sends a signal to deactivate the power source to turn off the carbonator pump 20, and shut down the transformer 62 and closes the solenoid valves 60. Because the flow of the beverage to the carbonator tank 24 is stopped after the beverage inside the tank 24 has reached a desired level, the beverage will not tend to push the carbon dioxide out of the carbonator tank 24 in situations where the beverage has a pressure that is approximately equal to or higher than the pressure of the carbon dioxide inside the tank 24.

Figure 3:
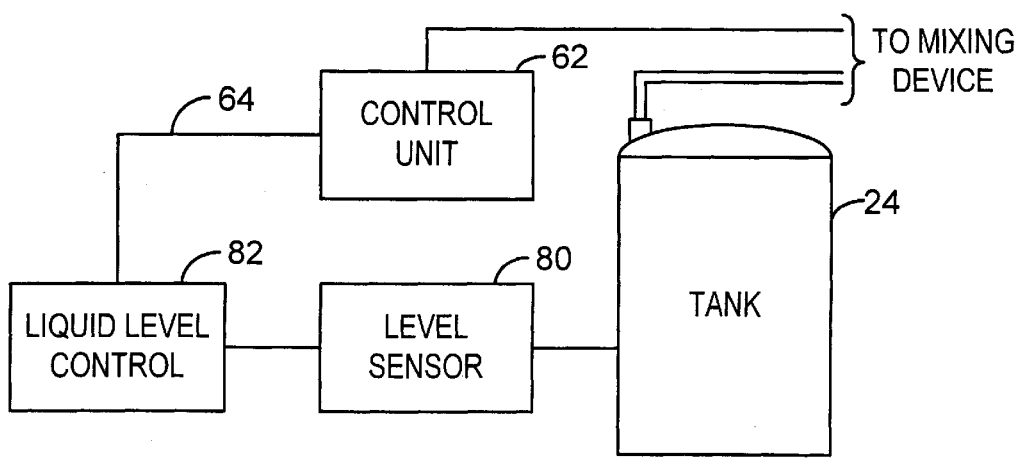
FIG. 3 is a block diagram schematically illustrating a portion of the autofill system in accordance with another embodiment of the invention.

Some carbonation systems may not include a carbonator pump, and an external pump is used for pumping the beverage to the tank 24. In an alternate embodiment shown in FIG. 3, a level sensor 80 is used to sense the liquid level in the tank 24. A liquid level control 82 is coupled with the level sensor 80, and communicates with the control unit 62 via the control line 64 to activate the flow of beverage to the tank 24 when the level sensor 80 senses a drop in the liquid level below a preset minimum beverage level in the tank 24. In that case, the liquid level control 82 sends a signal or supplies power to the transformer 62 to activate the solenoid valves 60 to flow the beverage to the beverage line 18. After the liquid level reaches an adequate level, the liquid level control 82 shuts down the transformer 62.

The provision of the sampling port 56 advantageously facilitates convenient and accurate monitoring of the consistency of the mixed beverage so that adjustments to the flow rates of the beverage concentrate and water can be made in the brix manifold 40 when necessary to achieve the desired mixing ratio. The sampling port 56 provides real time monitoring very close to the location of the mixing device 14 and allows real time adjustment of the brix manifold 40 to be made quickly and effectively. This avoids the need to dispose of a large batch of mixed beverage that is later discovered (e.g., at the point of dispensing the beverage farther downstream of the mixing device 14) to have failed to meet the required consistency or mixing ratio.

The present system 10 is a closed system because no intermediary open tank is required to mix the beverage and the water. Instead, the mixing device 14 provides accurate and consistent mixing in a closed system. The closed system minimizes introduction of contaminants into the mixing and dispensing process, so that cleaning or sanitizing does not need to be performed as frequently as in an open system.

The principles, preferred embodiments and modes of operation of the present invention have been described in the foregoing specification. However, the invention which is intended to be protected is not to be construed as limited to the particular embodiments disclosed. The embodiments are to be construed as illustrative rather than restrictive. Variations and changes may be made by others without departing from the spirit of the present invention. For example, more than one carbonator 22 can be coupled with a single mixing device 14. Furthermore, although the exemplary embodiment shows a carbonator 22, the system 10 may employ instead a refrigeration unit for cooling the beverage for dispensing a frozen or partially frozen beverage, or a dispensing unit for dispensing the beverage or the like. In those alternative embodiments, a pump is used to pump the beverage from the mixing device 14, and is also coupled with the control unit 62 and switch 60 via the control line 64 so that the beverage flows from the mixing device 14 to the pump only when the pump is powered. The improved control of the mixing and flow of the beverage from the mixing device may be important in systems that include a refrigeration unit or dispensing unit instead of a carbonator. For example, a proper mixing ratio is important for a beverage which is to be chilled in a refrigeration unit to prevent freezing into a block due to too much water content. Termination of the flow of beverage to a refrigeration unit may be required when the pump is turned off to control the chilling level of the frozen beverage produced in the refrigeration unit. Accordingly, all such variations and changes which fall within the spirit and scope of the present invention as defined in the following claims are expressly intended to be embraced thereby.

What is claimed is:

1. A system for preparing a beverage from a beverage concentrate, the system comprising:
    a mixing device having a beverage concentrate inlet for receiving a beverage concentrate, a water inlet for receiving water, and an outlet, the mixing device mixing the beverage concentrate and the water to produce a beverage for dispensing through the outlet;
    a carbonator having a carbonator inlet coupled with the outlet of the mixing device, the carbonator including a carbonator control; and
    a control unit coupled with the carbonator control and the mixing device, the control unit controlling flow of the beverage from the mixing device to the carbonator in response to the carbonator control, wherein the mixing device includes a switch the switch being controllable by the control unit between an ON position to allow flow of the beverage through the outlet and an OFF position to stop flow of the beverage through the outlet.

2. The system of claim 1 wherein the carbonator control comprises a pump for pumping the beverage from the outlet of the mixing device to the carbonator, the control unit allowing flow of the beverage from the mixing device to the carbonator when the pump is powered and stopping flow of the beverage from the mixing device to the carbonator when the pump is not powered.

3. The system of claim 1 wherein the carbonator comprises a carbonator tank having a beverage inlet for receiving beverage from the mixing device; and wherein the carbonator control comprises a level sensor for measuring liquid level in the carbonator tank, the control unit allowing flow of the beverage from the mixing device to the carbonator when the level sensor senses a liquid level below a preset minimum level and stopping flow of the beverage from the mixing device to the carbonator when the level sensor senses a liquid level at or above a preset maximum level.

4. The system of claim 1 wherein the switch comprises at least one solenoid valve disposed at or near the outlet of the mixing device.

5. The system of claim 4 wherein the control unit comprises a transformer, and wherein the carbonator control comprises a pump having a pump motor electrically coupled with the transformer, the pump motor supplying power to the transformer to activate the solenoid valve to allow flow of the beverage through the outlet of the mixing device only when the pump motor is powered.

6. The system of claim 1 wherein the carbonator comprises a pump and a carbonator tank having a beverage inlet coupled with the pump for receiving beverage from the pump and a carbonation inlet coupled to a source of carbon dioxide.

7. The system of claim 6 wherein the carbon dioxide inside the carbonator tank has a pressure which is approximately equal to or less than a pressure of the beverage inside the carbonator tank.

8. The system of claim 1 wherein the mixing device includes a mixing mechanism disposed downstream of the beverage concentrate inlet and the water inlet and disposed upstream of the outlet.

9. The system of claim 8 wherein the mixing mechanism comprises a static mixing tube.

10. The system of claim 8 wherein the mixing device comprises a main line coupled between the mixing mechanism and the outlet; and a bypass line coupled to the main line between the mixing mechanism and the outlet, the bypass line including a sampling port for sampling the beverage.

11. The system of claim 10 further comprising a beverage concentrate flow controller for controlling the flow of the beverage concentrate to the mixing mechanism and a water flow controller for controlling the flow of the water to the mixing mechanism.

12. The system of claim 11 wherein the beverage concentrate flow controller and the water flow controller are adjustable to achieve a desired mixing ratio for the beverage concentrate and the water in the beverage monitored at the sampling port.

13. The system of claim 10 wherein the sampling port is adjustable between an open position allowing flow of the beverage from the main line and a closed position shutting off flow of the beverage from the main line.

14. An apparatus for preparing a beverage from a beverage concentrate, the apparatus comprising:

a mixing device having a beverage concentrate inlet for receiving a beverage concentrate, a diluter inlet for receiving a diluter, and an outlet, the mixing device mixing the beverage concentrate and the diluter to produce a mixed beverage for dispensing through the outlet;

a beverage flow line disposed downstream of and coupled with the outlet of the mixing device;

a carbonator including a carbonator tank having a beverage inlet coupled with the beverage flow line and a carbonation inlet coupled to a source of carbondioxide, the carbonator including a level sensor for measuring liquid level in the carbonator tank;

a control line coupled between the mixing device and the level sensor;

a control unit coupled with the control line, the control unit allow beverage from the outlet of the mixing device to the carbonator when the level sensor senses a liquid level below a preset minimum level and stopping flow of the beverage from the mixing device to the carbonator when the level sensor senses a liquid level at or above a preset maximum level; and a switch which is controllable by the control unit to allow flow of the beverage through the outlet of the mixing device in an ON position and to stop flow of the beverage through the outlet of the mixing device in an OFF position.

15. The apparatus of claim 14 wherein the control unit comprises a transformer, and wherein the carbonator comprises a level control coupled with the level sensor and the transformer, the level control supplying power to the transformer to activate the switch to move to the ON position only when the level sensor senses a liquid level in the carbonator tank below the preset minimum level.

16. A system for preparing a beverage from a beverage concentrate, the system comprising:

a mixing device having a beverage concentrate inlet for receiving a beverage concentrate, a water inlet for receiving water, and an outlet, the mixing device mixing the beverage concentrate and the water to produce a beverage for dispensing through the outlet;

a carbonator having a carbonator inlet coupled with the outlet of the mixing device, the carbonator including a carbonator control; and a control unit coupled with the carbonator control and the mixing device, the control unit controlling flow of the beverage from the mixing device to the carbonator in response to the carbonator control, wherein the mixing device includes a mixing mechanism disposed downstream of the beverage concentrate inlet and the water inlet and disposed upstream of the outlet, wherein the mixing mechanism comprises a static mixing tube, and wherein the mixing device comprises a main line coupled between the mixing mechanism and the outlet, and a bypass line coupled to the main line between the mixing mechanism and the outlet, the bypass line including a sampling port for sampling the beverage.

17. The system of claim 16 wherein the carbonator control comprises a pump for pumping the beverage from the outlet of the mixing device to the carbonator, the control unit allowing flow of the beverage from the mixing device to the carbonator when the pump is powered and stopping flow of the beverage from the mixing device to the carbonator when the pump is not powered.

18. The system of claim 16 wherein the carbonator comprises a carbonator tank having a beverage inlet for receiving beverage from the mixing device; and wherein the carbonator control comprises a level sensor for measuring liquid level in the carbonator tank, the control unit allowing flow of the beverage from the mixing device to the carbonator when the level sensor senses a liquid level below a preset minimum level and stopping flow of the beverage from the mixing device to the carbonator when the level sensor senses a liquid level at or above a preset maximum level.

19. The system of claim 16 wherein the mixing device includes a switch, the switch being controllable by the control unit between an ON position to allow flow of the beverage through the outlet and an OFF position to stop flow of the beverage through the outlet.

20. The system of claim 19 wherein the switch comprises at least one solenoid valve disposed at or near the outlet of the mixing device.

21. The system of claim 20 wherein the control unit comprises a transformer, and wherein the carbonator control comprises a pump having a pump motor electrically coupled with the transformer, the pump motor supplying power to the transformer to activate the solenoid valve to allow flow of the beverage through the outlet of the mixing device only when the pump motor is powered.

22. The system of claim 16 wherein the carbonator comprises a pump and a carbonator tank having a beverage inlet coupled with the pump for receiving beverage from the pump and a carbonation inlet coupled to a source of carbon dioxide.

23. The system of claim 22 wherein the carbon dioxide inside the carbonator tank has a pressure which is approximately equal to or less than a pressure of the beverage inside the carbonator tank.

24. The system of claim 16 further comprising a beverage concentrate flow controller for controlling the flow of the beverage concentrate to the mixing mechanism and a water flow controller for controlling the flow of the water to the mixing mechanism.

25. The system of claim 24 wherein the beverage concentrate flow controller and the water flow controller are adjustable to achieve a desired mixing ratio for the beverage concentrate and the water in the beverage monitored at the sampling port.

26. The system of claim 16 wherein the sampling port is adjustable between an open position allowing flow of the beverage from the main line and a closed position shutting off flow of the beverage from the main line.

* * * * *